United States Patent [19]

Funada

[11] Patent Number: 5,321,529
[45] Date of Patent: Jun. 14, 1994

[54] COLOR IMAGE PROCESSING WITH SMOOTHING OF DIFFERENTIAL COMPONENTS AND ADDITION OF THE RESULT TO A SPECIFIC COLOR COMPONENT

[75] Inventor: Masahiro Funada, Yokohama, Japan

[73] Assignee: Canon Kabushiki Kaisha, Tokyo, Japan

[21] Appl. No.: 700,513

[22] Filed: May 15, 1991

[30] Foreign Application Priority Data

May 17, 1990 [JP] Japan .................................. 2-125474

[51] Int. Cl.$^5$ .............................................. H04N 1/46
[52] U.S. Cl. .................................... 358/500; 358/518; 358/451
[58] Field of Search ................... 358/75, 80, 448, 452, 358/461, 463, 167, 168, 500, 501, 525, 528, 518; H04N 1/46

[56] References Cited

U.S. PATENT DOCUMENTS

| | | | |
|---|---|---|---|
| 4,677,465 | 6/1987 | Alkofer | 358/75 |
| 4,953,014 | 8/1990 | Takaragi | 358/451 |
| 4,963,978 | 10/1990 | Ueda et al. | 358/80 |
| 4,974,072 | 11/1990 | Hasegawa | 358/80 |
| 4,985,760 | 1/1991 | Maeshima et al. | 358/80 |
| 4,999,717 | 3/1991 | Nagashima | 358/448 |

FOREIGN PATENT DOCUMENTS

| | | | |
|---|---|---|---|
| 0169166 | 7/1991 | Japan | H04N 1/46 |
| 404022274A | 1/1992 | Japan | H04N 1/46 |

*Primary Examiner*—Edward L. Coles, Sr.
*Assistant Examiner*—Jerome Grant, II
*Attorney, Agent, or Firm*—Fitzpatrick, Cella, Harper & Scinto

[57] ABSTRACT

A color image processing apparatus includes an input unit for inputting a plurality of color component signals representing a color image, a first operation unit for obtaining differences between a specified color component signal among the plurality of color component signals and other color component signals and outputting the differential signals, a second operation unit for smoothing-processing the differential signals obtained by the first operation unit, and a third operation unit for adding the differential signals smoothing processed by the second operation unit and the specified color component signal and outputting the result as the other-color component signals.

20 Claims, 22 Drawing Sheets

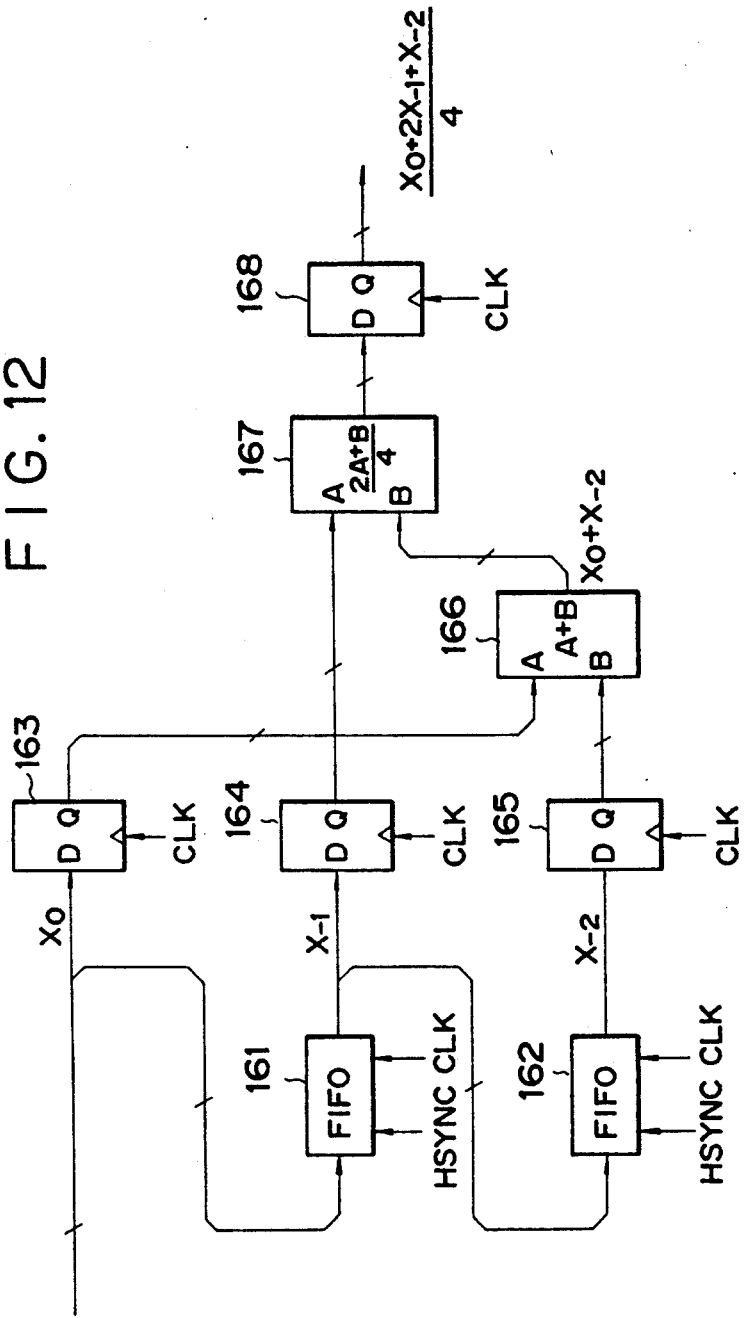
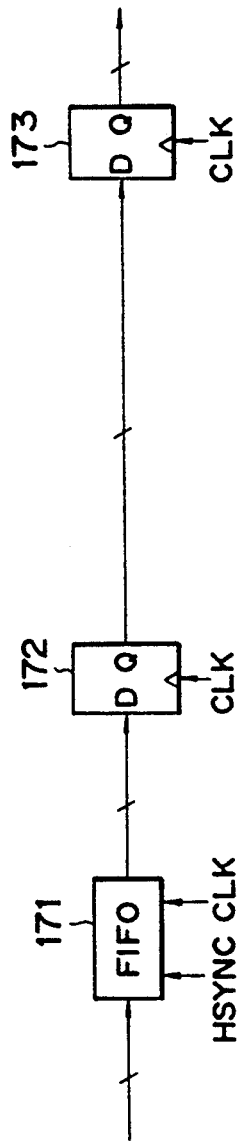
FIG. 12
FIG. 13

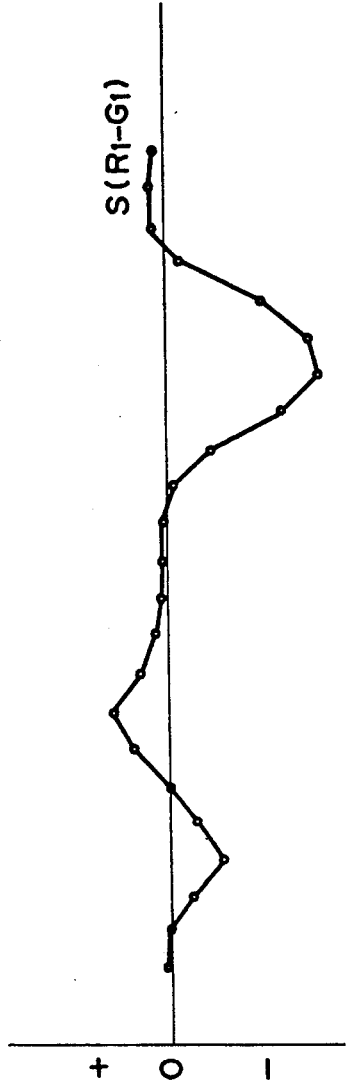
F I G. 15C
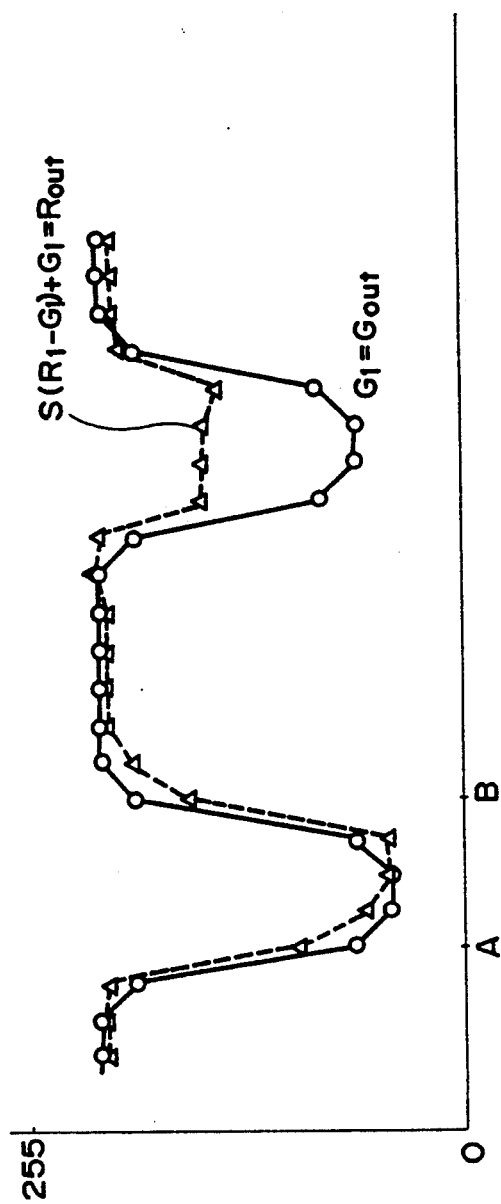
F I G. 15D

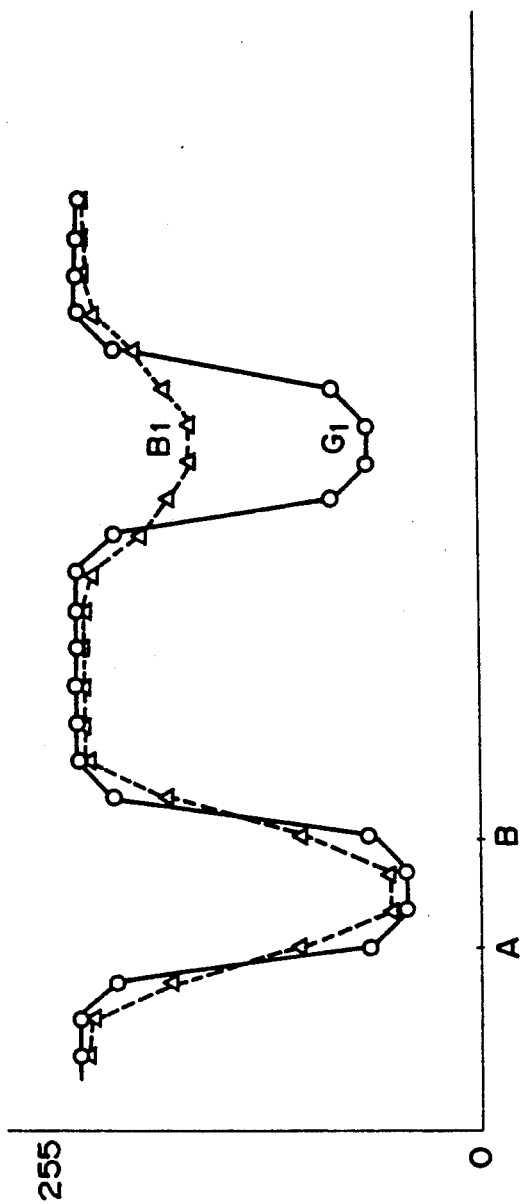
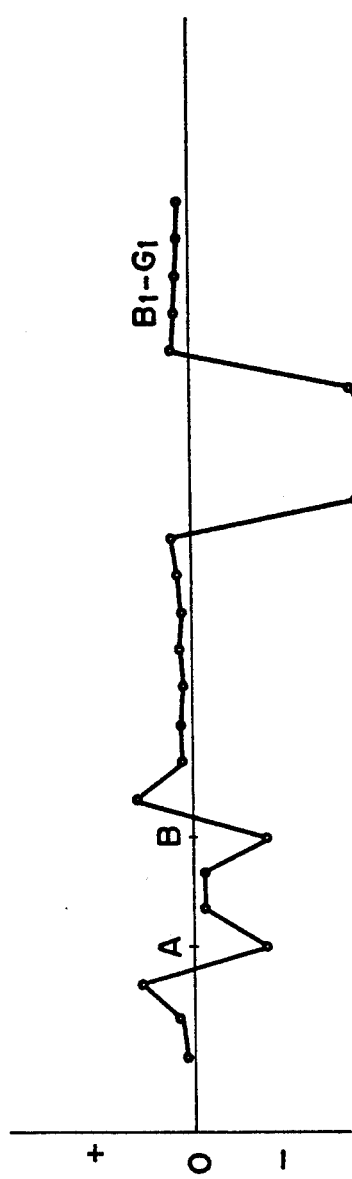
FIG. 16A
FIG. 16B

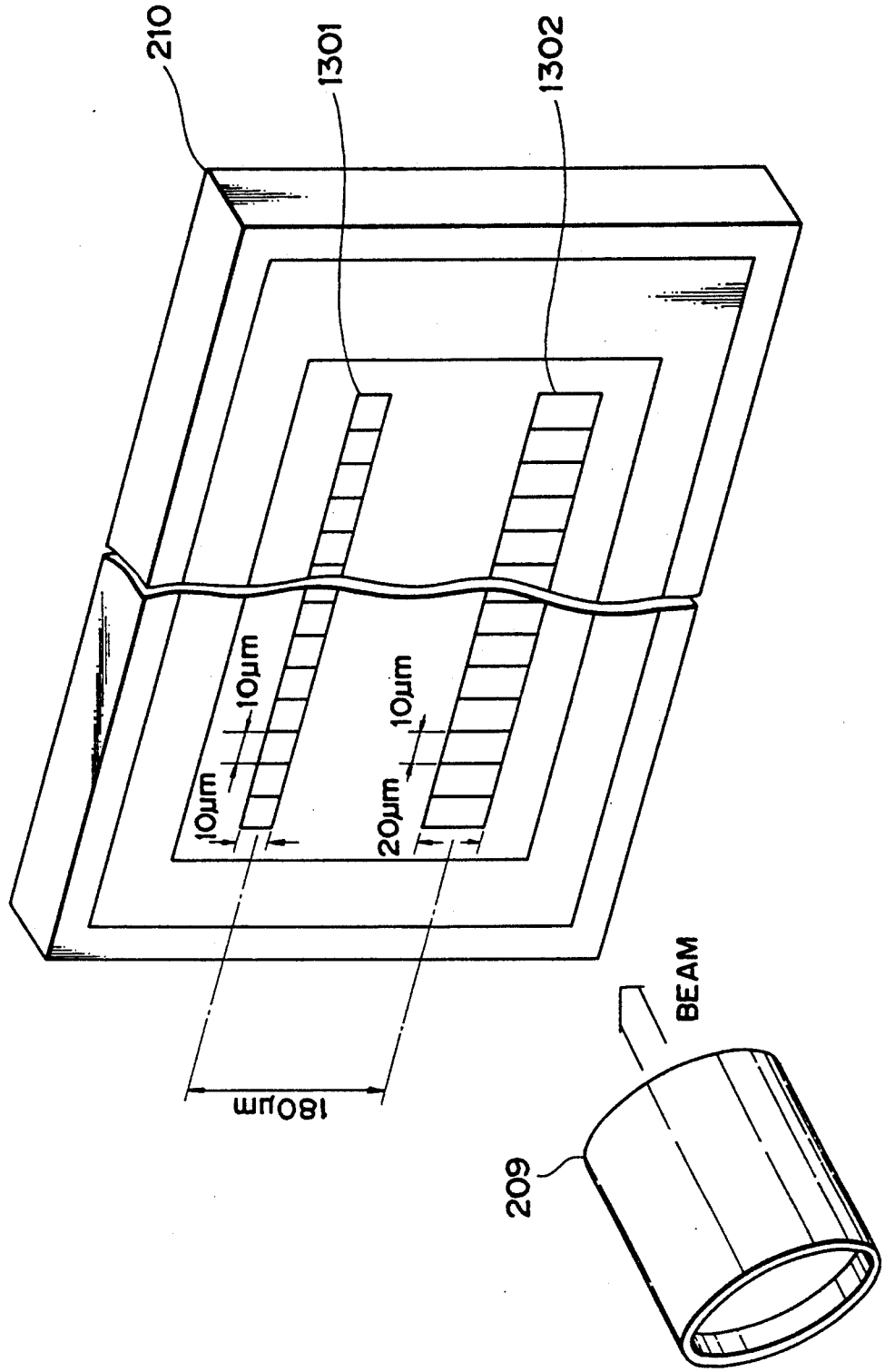

COLOR IMAGE PROCESSING WITH SMOOTHING OF DIFFERENTIAL COMPONENTS AND ADDITION OF THE RESULT TO A SPECIFIC COLOR COMPONENT

BACKGROUND OF THE INVENTION

1. Field of the Invention

The present invention relates to a color image processing apparatus for processing a color image signal representing a color image.

2. Related Background Art

In order to process a color image electrically, it is well known that a color image signal is formed by reading the color image with a plurality of sensors having different spectral-response characteristics. The assignee of the present invention has proposed a constitution of reading a color image with a plurality of sensors having different spectral-response characteristics, in U.S. Pat. Nos. 4,974,072, 4,953,014 and 4,985,760.

In these documents, a CCD having line filters of athree-line pattern B (blue), G (green) and R (red) is used, as shown in FIG. 6. Accordingly, a portion at a black edge is colored due to the difference in MTF (Modulation Transfer Function) between sensors having different spectral-response characteristics, so that there is an adverse effect on the decision of saturation. That is, as shown in FIG. 16A, a G (green) signal rises up sharply, while a B (blue) signal rises up gradually. As a result, while the points A and B should gray, whereas actually, the peripheral region may become greenish, and the internal region bluish.

In addition to the above color aberration due to difference of MTF, there is a color aberration caused by physical misregistrations of sensors. That is, the CCD of three lines is used as shown in FIG. 6, temporal correction (insertion of a delay circuit) is necessary because the focusing position of each sensor is different. However, as mechanical vibration cannot be suppressed, the phase of each signal becomes slightly displaced, as shown in FIG. 15A. Specifically, considering R (red) and G (green) as shown in FIG. 15, even with the same shape of sensor, the line becomes reddish at point A and bluish at point B, so that a portion of black edge yields some color aberration.

As above described, the color aberration caused by differences in MTF for a three-line sensor or mechanical vibration has a disadvantage of bringing about many inconveniences in various image processings performed at later stages.

SUMMARY OF THE INVENTION

In view of the foregoings, an object of the present invention is to provide a color image processing apparatus capable of correcting for color aberration produced in reading a color image in a simple and suitable manner.

Also, the present invention provides a color image processing apparatus capable of correcting for not only color aberration produced by the variable power processing of image, bt also that produced by mechanical vibration or differences between signal characteristics of colors.

According to the present invention, there is provided a color image processing apparatus capable of correcting for color aberration owing to various causes, by smoothing a differential signal with respect to a reference signal, and adding the reference signal to a smoothed differential signal.

The above objects and effects of the present invention, together with other objects and effects, will become more fully apparent upon consideration of the following description.

BRIEF DISCRIPTION OF THE DRAWINGS

FIG. 12 is a circuit diagram showing the detail of a smoothing circuit.

FIG. 13 is a circuit diagram showing the detail of a delay circuit 153 as shown in FIG. 1.

FIGS. 14A to 16D are views for explaining a principle of color aberration correction.

FIGS. 19-21 are views showing another example of the present invention.

DESCRIPTION OF THE PREFERRED EMBODIMENT DETAILED

An example of the present invention will be described in detail below.

Figure 1:
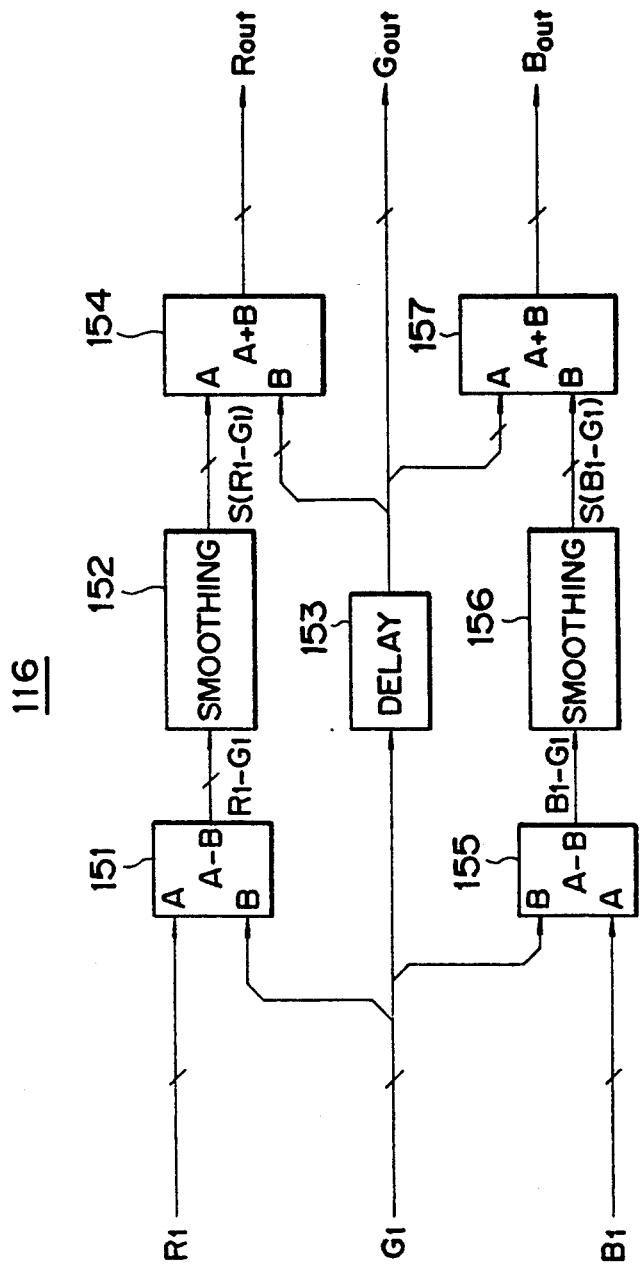
FIG. 1 is a circuit diagram showing an example of a color aberration correction circuit to which the present invention is applied.
Figure 2:
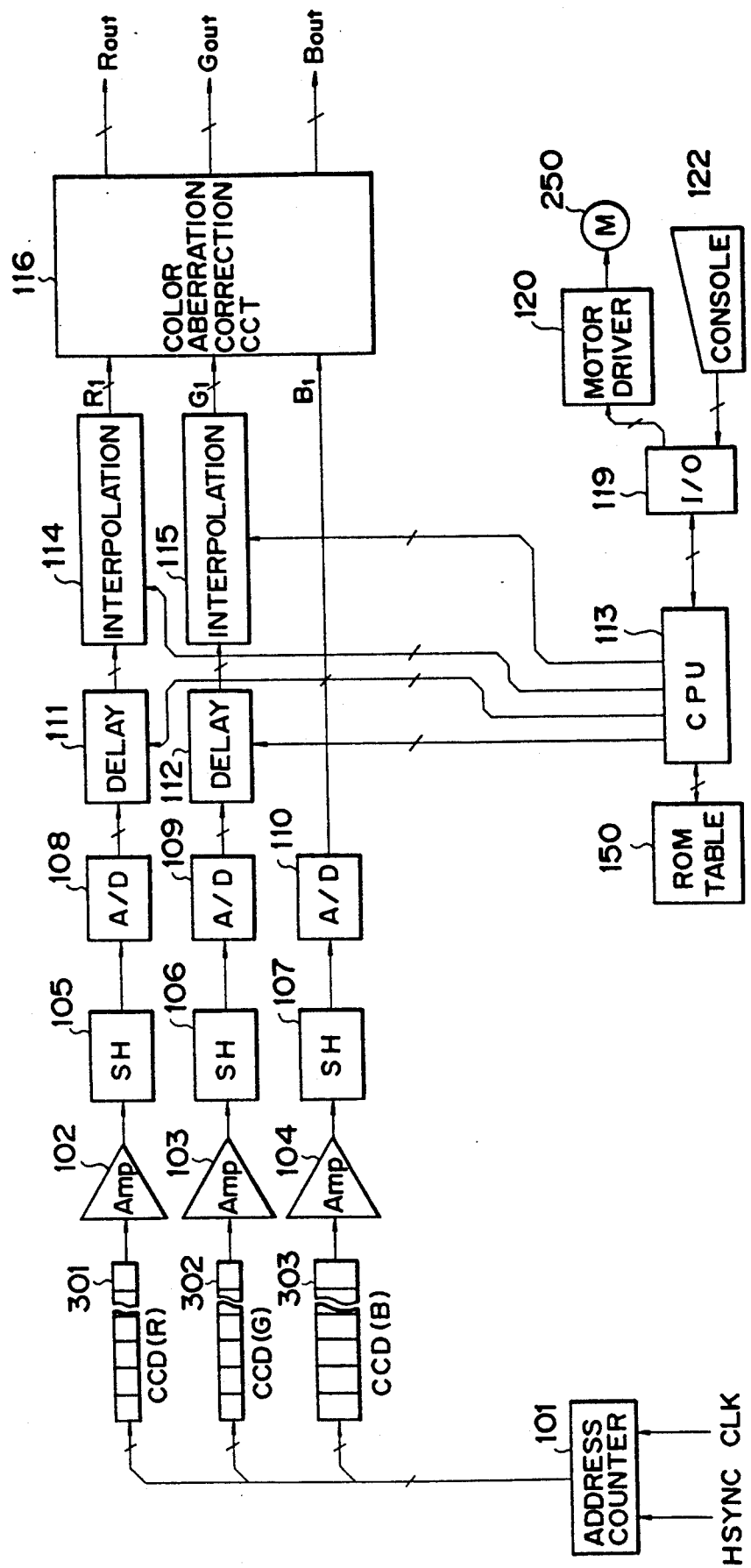
FIG. 2 is a block diagram showing the whole of a correction system including the color aberration correction circuit as shown in FIG. 1.

FIG. 1 is a circuit diagram showing an example of a color aberration circuit to which the present invention is applied. FIG. 2 is a block diagram showing the whole of a color image processing system including the color aberration correction circuit 116 as shown in FIG. 1. FIG. 3 is a view for explaining the characteristics of smoothing (smoothness) circuits 152, 156 as shown in FIG. 1.

Figure 4:
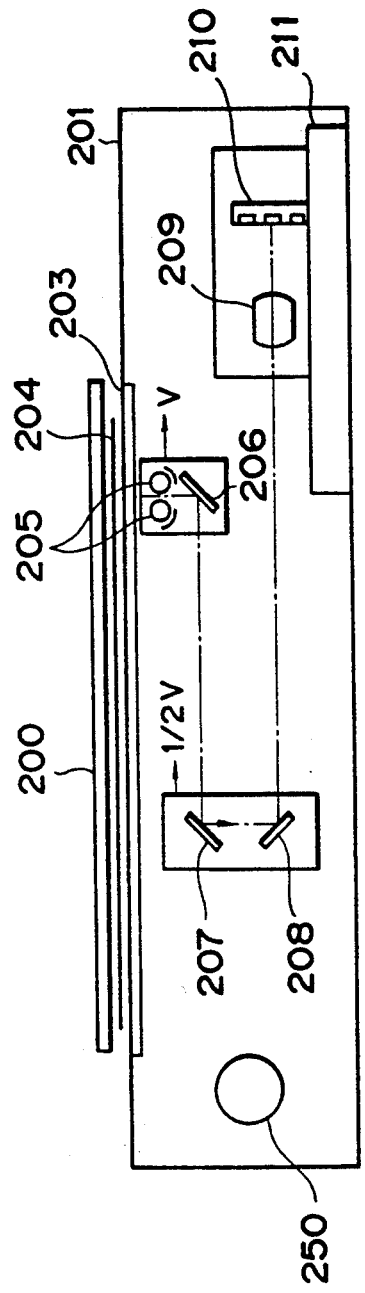
FIG. 4 is a cross-sectional constitution view of an example for a color image scanner.

FIG. 4 is a cross-sectional constitution view of an example of image scanner for reading a color image. In FIG. 4, 201 is an image scanner unit, that is, a portion for reading an original and performing digital signal processing on thr read signals.

In the image scanner portion 201, 200 is a specularp-pressure plate which can be opened or closed for fixing the original 204 on an original glass board (thereafter referred to as a platen) 203. The original 204 on the platen 203 is illuminated by a lamp 205, and its image is reflected to mirrors 206, 207, 208, further passed through a lens 209, and formed onto a three-line sensor 210 (thereafter referred to as CCD). The output of the three-line sensor 210 is transferred to a color decision unit 211 as the full-color information (red (R), green (G), blue (B) components). It is note that the lamp 205 and the mirror 206 are driven at a rate of V, and the mirrors 207 and 208 are driven at a rate of ½ V, mechanically in a direction (sub-scan direction) perpendicular to an electrical scanning direction (main scan direction) of the three-line sensor 200, by means of well known driving means having a motor 250, in order to make the sub-scan all over the original.

Figure 5:
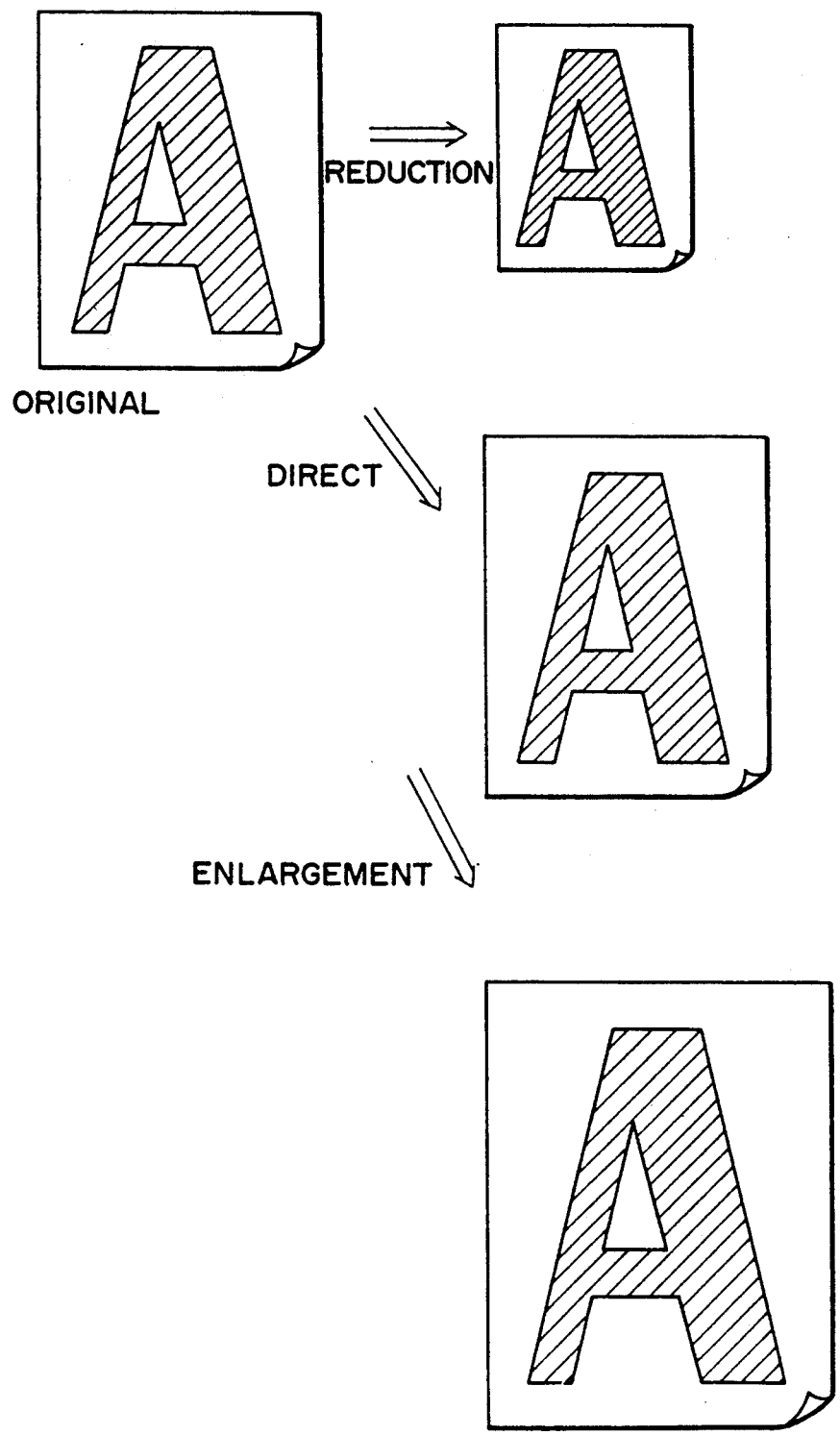
FIG. 5 is a view of explanation for enlarged, reduced and direct powers.

Moreover, in the main scan direction, the power is varied to a desired magnification by applying a well known electrical signal processing. In the sub-scan direction, the power can be also varied by making variable the number of rotations for the motor 250 and thus the rate V. And with a combination of main scan and sub-scan variable powers, it is possible to perform the reading in variable power as shown in FIG. 5.

Figure 6:
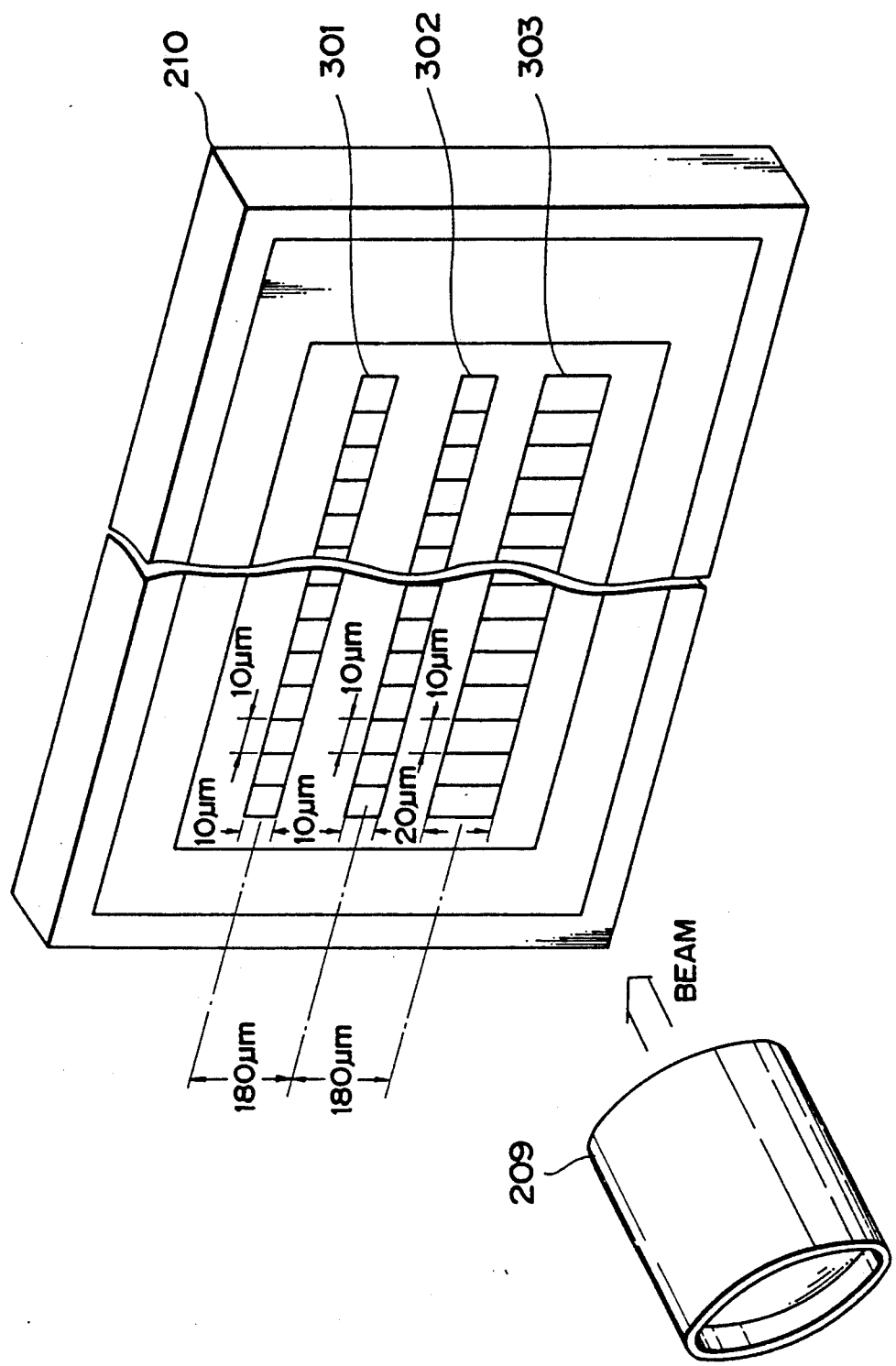
FIG. 6 is an external view of a three-line CCD.

FIG. 6 shows an appearance of a three-line CCD 210. Here, 301 is a line sensor for red (R) component, with its surface where a plurality of photodetectors for the line sensor are provided being covered with a filter for transmitting only the light of the red component. Similarly, 302 is a line sensor for the green component (G) and 303 is a line sensor for the blue component (B), with the respective surfaces having a plurality of photo-detectors being covered with filters for transmitting only the respective lights of green and blue components.

The line sensors are arranged parallel and adjacent to each other at a pitch of 180 μm, wherein the B line sensor 303 is constituted of an array of photo-detectors having a dimension of 20 μm × 10 μm, and the R and G line sensors 301, 302 are constituted of arrays of photo-detector having a dimension of 10 μm × 10 μm.

Here, the fact that the photo-detector area of the B line sensor 303 is different from that of each of the R and G line sensors 301, 302 is based on the following reason. That is, the transmissivity of blue light in transmission filter only for blue light component is generally lower than that of red/green light in transmission filter only for red/green light component. Accordingly, in order to improve the S/N ratio (signal/noise ratio) for the signal, the light receiving area is made larger only for the B line sensor 303, so that the output signal level of the B line sensor 303 may be equal to that of each of the R and G line sensors 301, 303.

Figure 7:
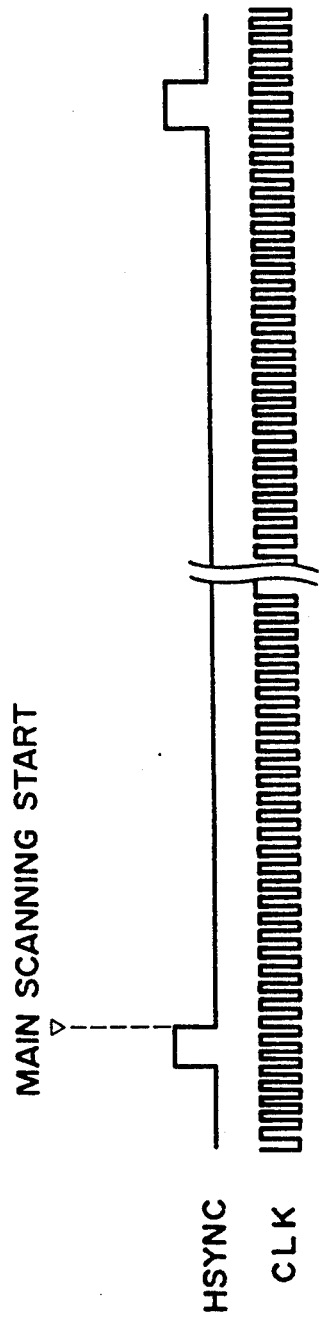
FIG. 7 is a timing chart showing the relation between a synchronizing signal HSYNC for reading of main scan and an image data transfer clock CLK.

FIG. 7 is a timing chart showing a synchronizing signal HSYNC for reading in main scan and a transfer clock signal CLK for image data.

In FIG. 2, 101 is an address counter for supplying a read address to the line sensors (R) 301, (G) 302 and (B) 303. An image read by the line sensors 301, 302 and 303 is converted into an electrical signal, amplified by the respective amplifiers 102, 103 and 104, passed through sample-and-hold circuits 105, 106, 107 and A/D converters 108, 109, 110, and output as the digital signal.

111 and 112 are delay elements, each consisting of a first-in-first-out memory element (thereafter referred to as FIFO memory), for adjusting the delay between lines of the three-line CCD in accordance with a magnification for reading.

150 is a ROM table for storing set-up data for each unit corresponding to the magnification.

113 is a CPU for controlling the whole of apparatus, in which a desired data is set to a motor driver 120, in accordance with the information of magnification and others which have been input via an I/O port 119 from a console 122. The motor driver 120 sends a driving signal corresponding to a desired magnification to a motor 250, in accord with set data, so as to read and scan at a desired rate.

Figure 8:
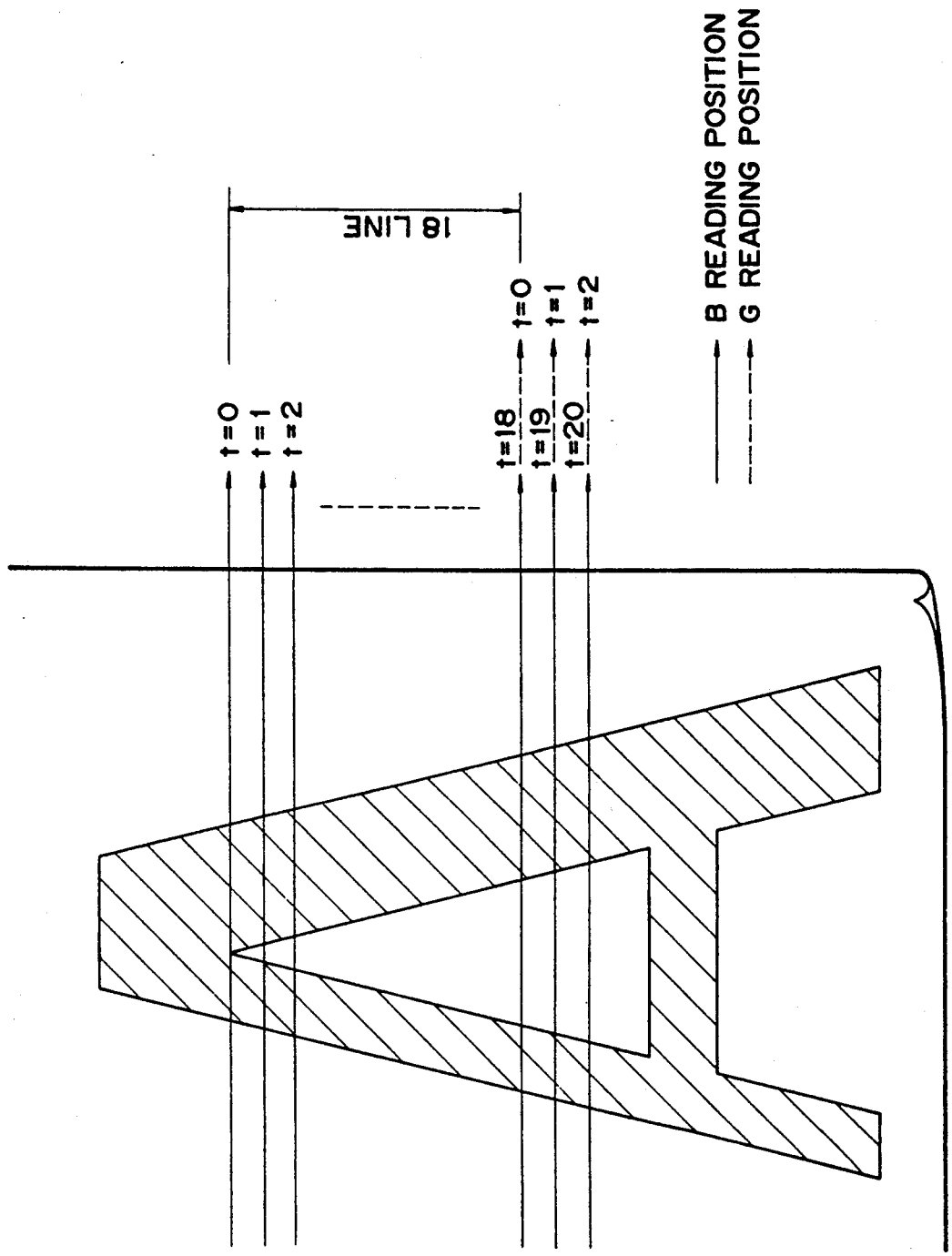
FIG. 8 is an explanation view for reading at direct power.

Specifically, at direct magnification, for example, the G line sensor 302 and the B line sensor 303 read positions separated by 18 lines, as shown in FIG. 8. Moreover, provided that one main scan, i.e., an interval of HSYNC signals, is a unit, indicated by time t, a reading position of the G line sensor 303 at t=0 and a reading position of the B line sensor 302 at t=18 are coincident. Accordingly, a delay of 18 lines has been present to the delay element 112 by the CPU 113.

Similarly, in the direct magnification, a delay of 36 lines is set to the delay element 112 whereby spatial drifts between three signals R, G and B can be removed.

Figure 9:
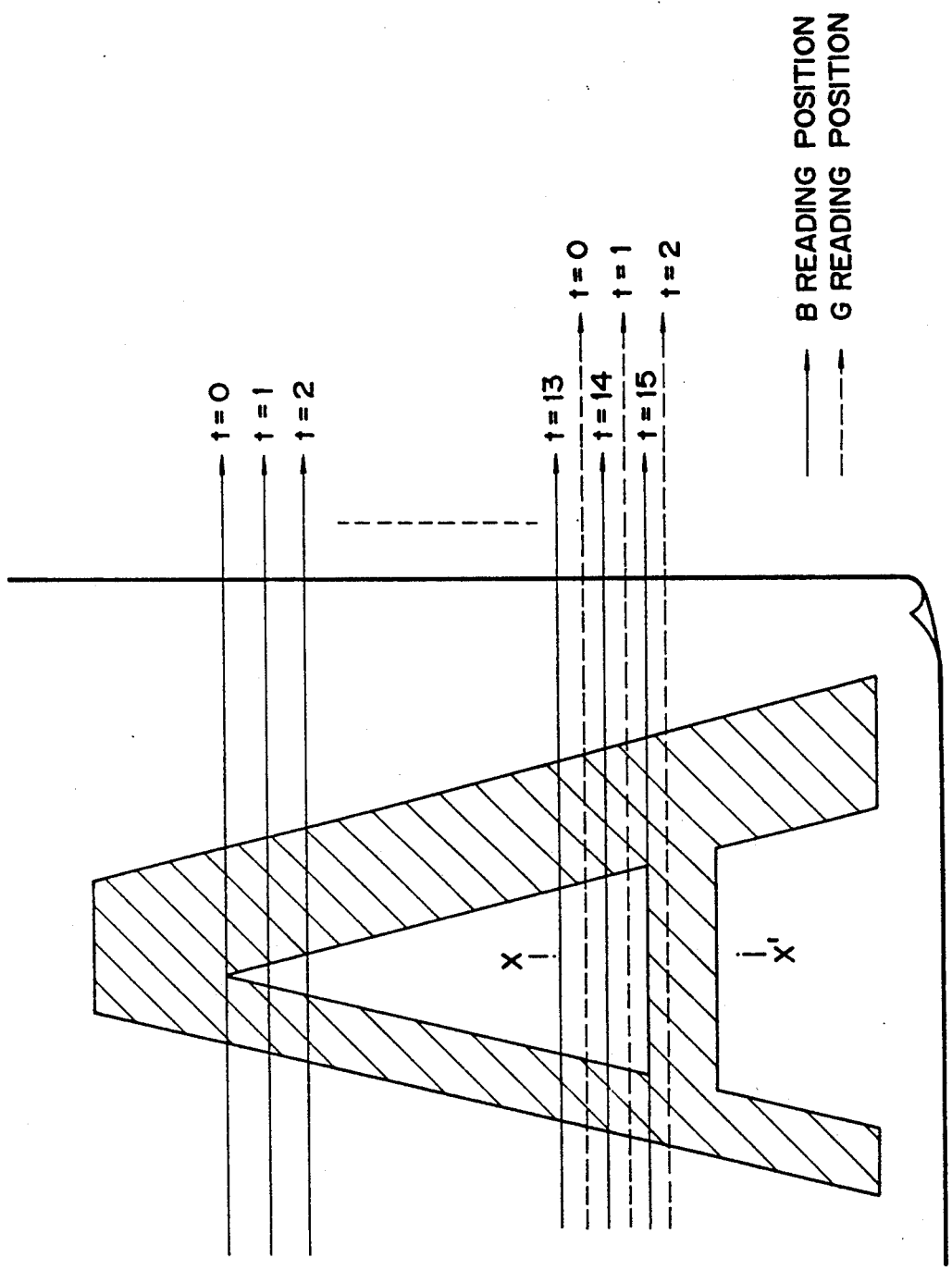
FIG. 9 is an explanation view for reading at reduced power.

However, as shown in FIG. 9, for example, at a reduction of 75%, the B line sensor 302 cannot read the exact position which the G line sensor 303 has read at t=0, because the scanning is performed at three-fourths the sub-scan rate V of optical system at 100% (direct). That is, an approximately central position between reading positions at t=13 and t=14 of the B line sensor 302 is one which the G line sensor 303 has read at t=0.

Figure 10:
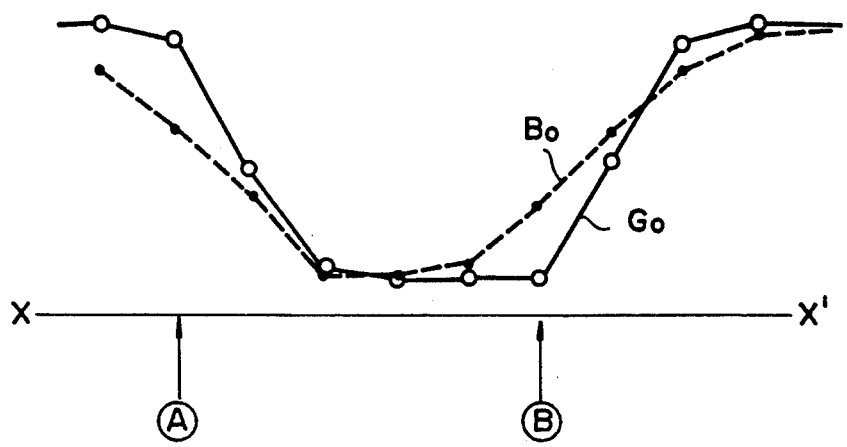
FIG. 10 is a signal level chart for explaining the reading as shown in FIG. 9.

Then, FIG. 10 shows the signal level for each of the B and G line sensors in the line X—X' of FIG. 9. Here, Go and Bo are output signals from the delay element, but a phase shift below one line is always produced.

Moreover, color aberration may also occur due to physical misregistrations, caused by the vibration or differences between spatial frequency characteristics (MTF).

Figure 11:
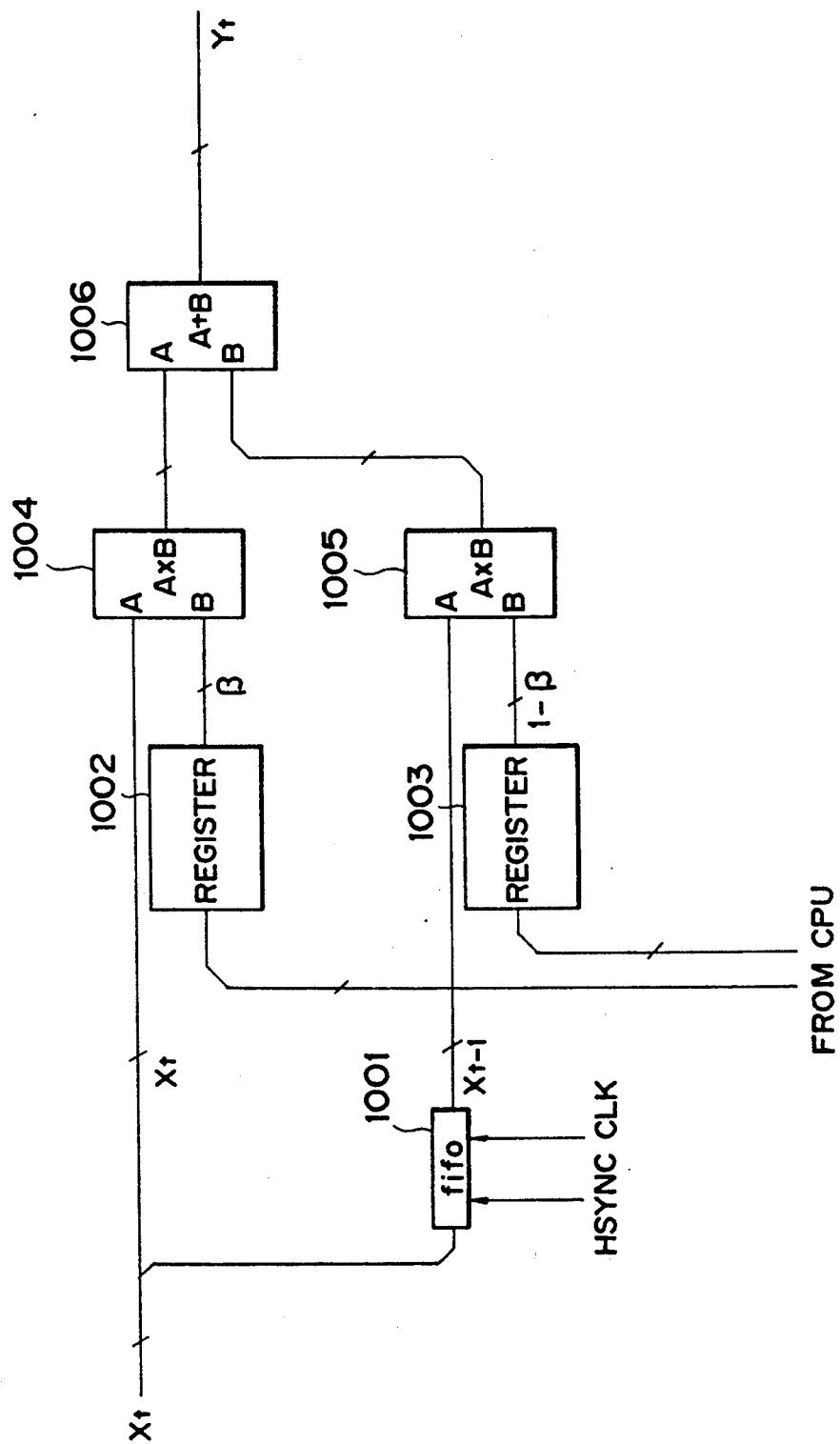
FIG. 11 is a circuit diagram showing the detailed configuration of a correction circuit.

Thus, in order to correct for a phase shift of below one line, interpolation circuits 114 and 115 are provided as shown in FIG. 2. These interpolation circuits 114 and 115 are constituted of same circuit, and the detail thereof is shown in FIG. 11. That is, it is constituted of a first-in-first-out memory (FIFO memory) 1001, registers 1002 and 1003, multipliers 1004 and 1005, and an adder 1006. Then, the interpolation rates $\beta$ and $(1-\beta)$ precalculated in accordance with a variable power rate by the CPU 113 are written into the registers 1002 and 1003, and by carrying a signal $X_{t-1}$ which is delayed by one line from an input signal $X_t$, an output $Y_t$ such as $$Y_t = \beta X_t + (1-\beta) X_{t-1}$$

is obtained.

Here, there is a relation such as $0 \leq \beta \leq 1$, in which by setting the value of $\beta$ to a predetermined value in accordance with the variable power rate, a signal with arbitrary delay below one line can be produced. That is, $Y_t = X_{t-1}$ at $\beta = 0$, $Y_t = X_t$ at $\beta = 1$, and $Y_t$ can be arbitrarily interpolated between $X_t$ and $X_{t-1}$ in $0 < \beta < 1$.

With the delay circuits 111, 112 and the interpolation circuits 114, 115 as shown in FIG. 2, phases of three signals $R_1$, $G_1$, $B_1$ can be ideally matched irrespective of the variable power ratio, but actually, more or less phase shift may be generated owing to the phase shift caused by the vibration of apparatus or the fluctuation of the sub-scan rate. Moreover, color aberration will be produced due to the difference between gain characteristics in the spacial frequency, which may be caused by the difference between the characteristics of sensors themselves, such as opening area of sensor, or the optical system, in other words, the differencs in MTF.

In order to correct for such color aberration, the color aberration correction circuit 116 as shown in FIG. 1 is connected at the stage after the interpolation circuits 114, 115 and the A/D conversion circuit 110.

In the color aberration correction circuit 116 as shown in FIG. 1, $R_1$, $G_1$ and $B_1$ are three primary color signals (the same as $R_1$, $G_1$ and $B_1$ shown in FIG. 2) which have corrected for the phase shift in accordance with the variable power rate, and $R_{out}$, $G_{out}$ and $B_{out}$ are three primary color signals after correction (coincident with $R_{out}$, $G_{out}$ and $B_{out}$ shown in FIG. 2).

In FIG. 1, 151 and 155 are subtraction circuits which calculate a difference $R_1-G_1$ between $R_1$ and $G_1$ and a difference $B_1-G_1$ between $B_1$ and $G_1$, respectively, and input them into the smoothing circuits 152, 156, respectively.

FIG. 12 shows a detailed circuit configuration of the smoothing circuits 152, 156. These smoothing circuits 152 and 156 are constituted of an exactly same circuit. In FIG. 12, 161 and 162 are line memories each consisting of a FIFO memory, for generating the delay of one line in a sub-scan direction. 163, 164, 165 and 168 are flip-flops for producing the delay of one pixel in a main scan direction. 166 is an adder which outputs A+B for inputs A and B. 167 is also an adder which outputs (2A+B)/4 for inputs A and B. As a result, assuming that $X_{31\ 1}$ is a signal delayed by one line, and that $X_{-2}$ is a signal delayed by two lines for an input $X_0$, a flip-flop 168 outputs $(X_0+2X_{-1}+X_{-2})/4$.

Figure 3A:
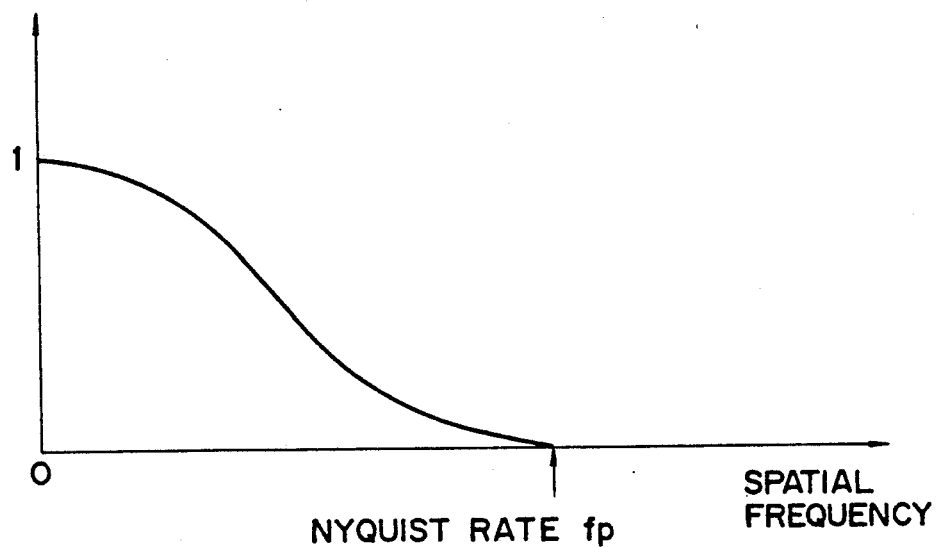
FIGS. 3A and 3B are views for explaining the characteristic of a smoothing (smoothness) circuit as shown in FIG. 1.
Figure 3B:
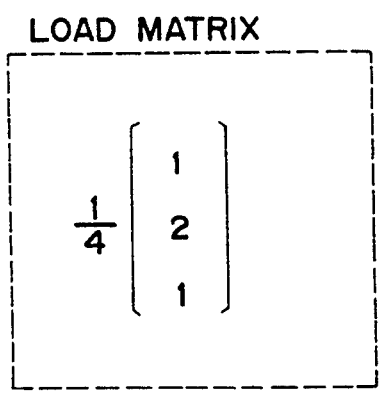

This is a spacial filter having a load matrix as shown in FIG. 3B, with its spacial frequency gain characteristic in the sub-scan direction being a low-pass filter as shown in FIG. 3A.

The delay circuit 153 as shown in FIG. 1 is constituted of a line memory 171 consisting of a FIFO memory and flip-flops 172, 173, as shown in FIG. 13, for producing a same delay for the $G_1$ signal as that with the smoothing circuits 152, 156 for synchronization.

Further, in FIG. 1, differential signals S ($R_1-G_1$) and ($B_1-G_1$) which have been smoothing processed by the smoothing circuits 152 and 156 are input into the adders 154 and 157, respectively, to which the $G_1$ signal ($G_{out}$) synchronized in the delay circuit 153 is added. And corrected $R_{out}$ and $B_{out}$ signals are output as the color aberration corrected signal, together with an output $G_{out}$ of the delay circuit 153.

Figures 16C, 16D:
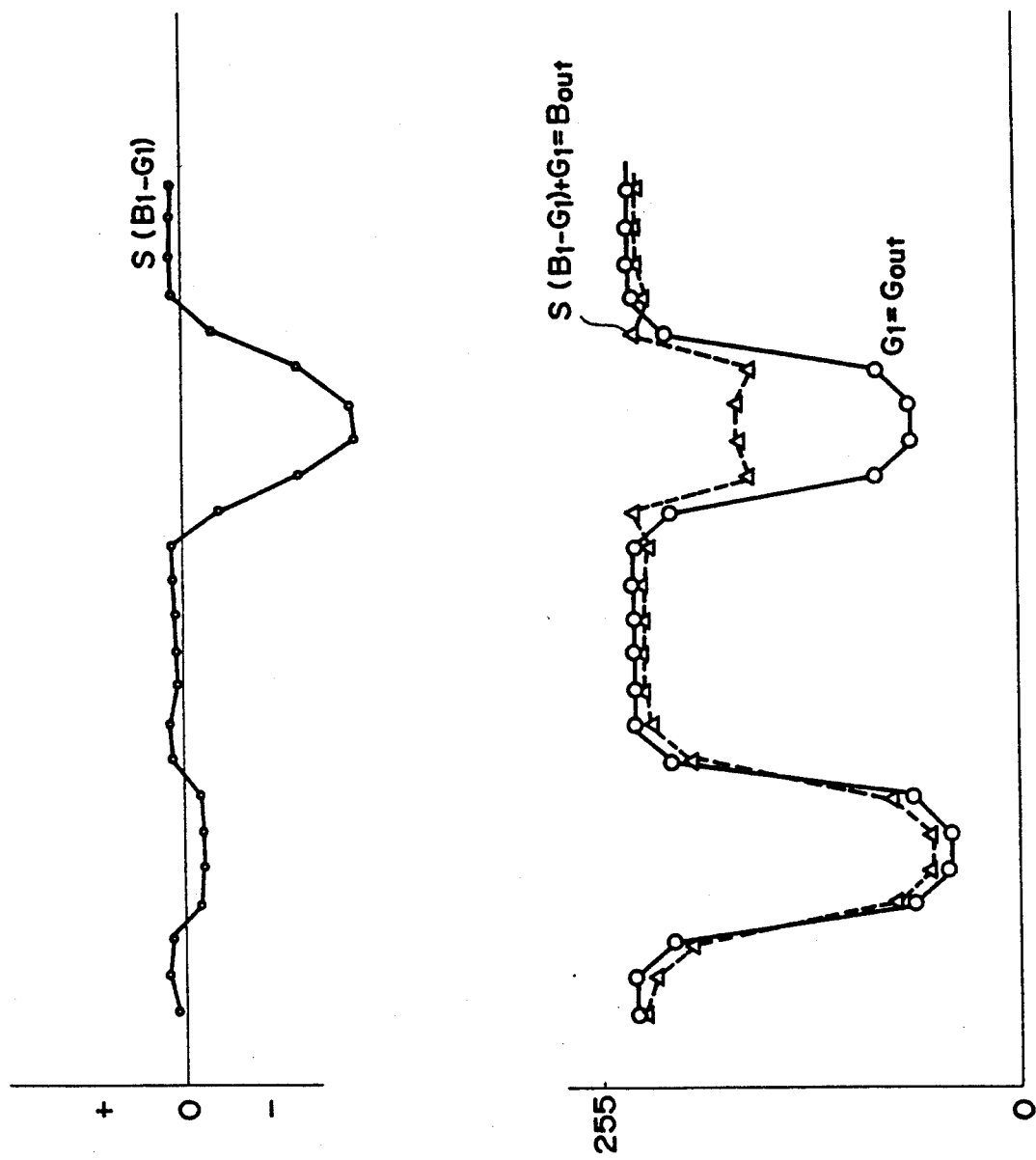

Next, the principle of color aberration correction will be described with reference to FIGS. 14 and 16.

Figure 14B:
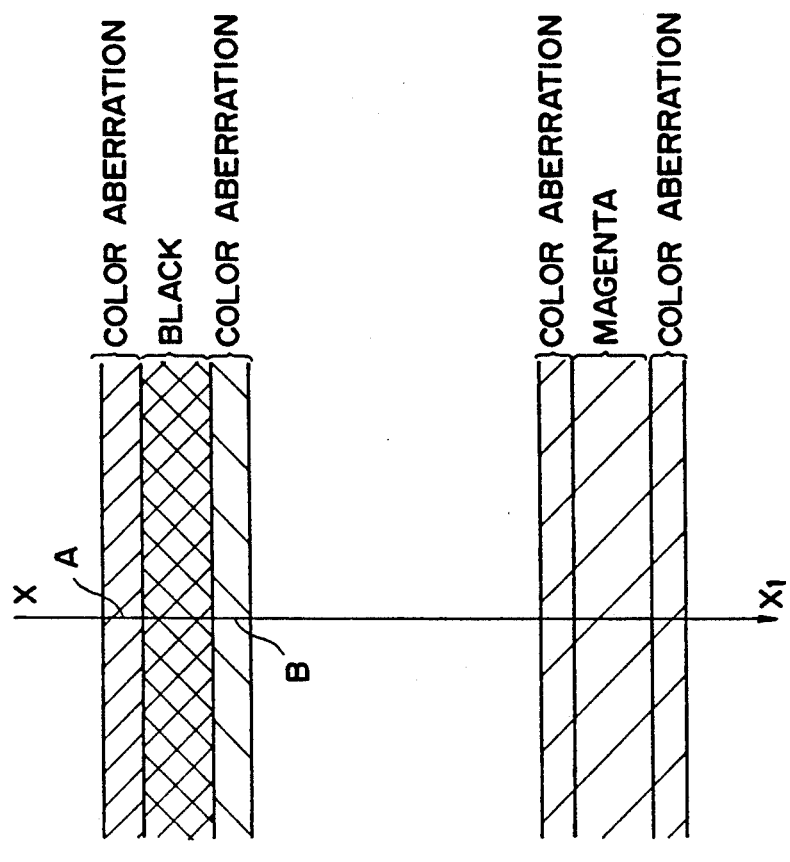
Figure 14A:
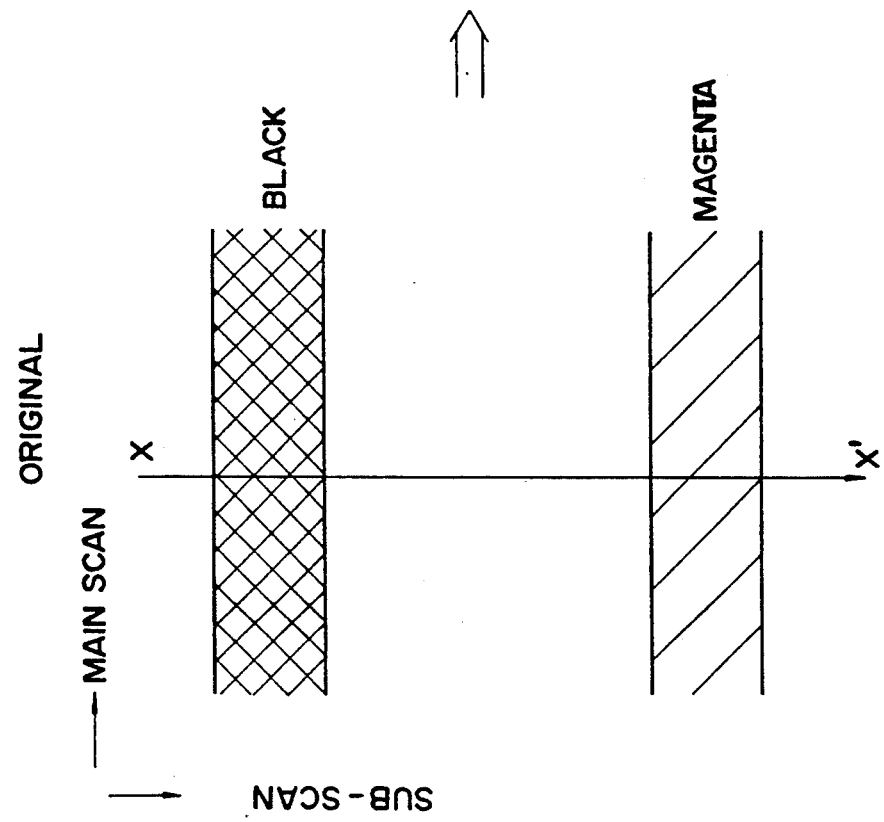

In FIGS. 14A and 14B, when an original such as FIG. 14A, i.e., black and magenta lines, is read, a read signal of sensor may produce color aberration at edge portions of black and magenta lines before correction, as shown in FIG. 14B.

Referring now to FIGS. 15A to 15D an example of color aerration owing to the phase shift and its correcting method will be described.

Figures 15A, 15B:
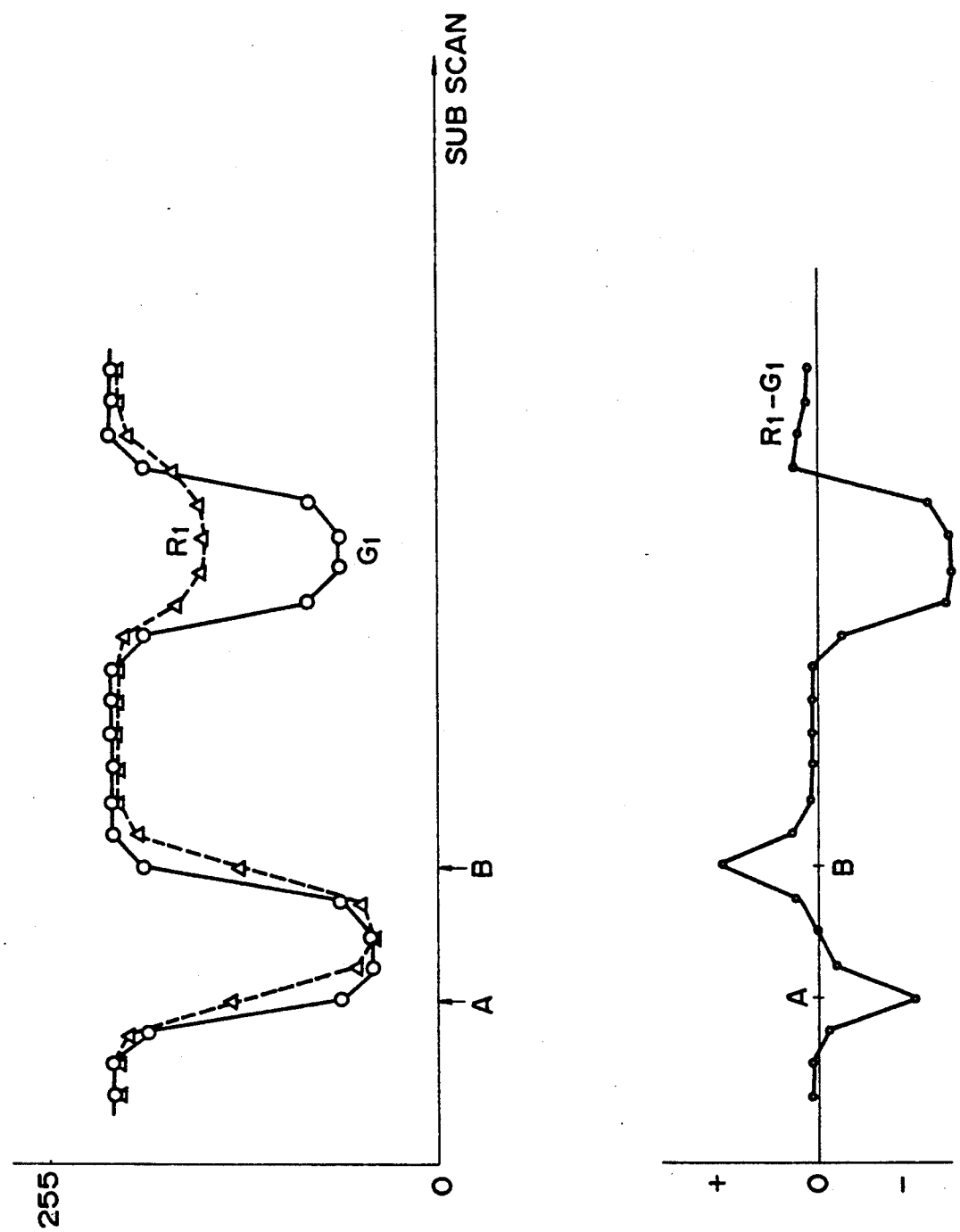

FIG. 15A shows the signal level at the line X—X' in FIG. 14B. In this example, as the phase shift between $R_1$ and $G_1$ is produced due to the vibration of read system, as shown in FIG. 15A, color aberration is remarkable particularly at points A and B. Then, the difference between $R_1$ and $G_1$ is represented by FIG. 15B, in which the differential value is shown as steep impulse shape at points A and B. FIG. 15C shows one as smoothed with the smoothing circuit as shown in FIG. 12. Thus, the peak values of A and B points become closer to zero. Further, $R_{out}$ obtained by addition of $G_1$ and $G_1=G_{out}$ is superimposed in FIG. 15D.

Thereby, it can be seen that the color aberration at points A and B is greatly improved, and the color aberration around the magenta line is also improved.

FIGS. 16A to 16D show an example of correcting for color aberration caused by the difference of MTF. Like the previous example, an example of $B_1$ and $G_1$ is given, using signal values in the line X—X' of FIG. 14B. Here, as $B_1$ is lower in MTF than $G_1$ (i.e., the gain at high frequency is spatially lower), color aberration is produced at edge portions of black lines such as at points A and B.

And the difference $B_1-G_1$ is shown by FIG. 16B, the same impulse signals as those in FIG. 15B can be obtained at points A and B. Next, $S(B_1-G_1)$ in FIG. 15C is obtained by smoothing this, and further $B_{out}$ is obtained by addition of $G_1$, and represented along with $G_{out}$ in FIG. 15D whereby it can be seen that the color aberration at edge portions has been relieved.

While in FIGS. 15A-15D and 16A-16D, the spatial phase shift and color aberration due to irregular MTFs have been described individually by way of example, respectively, it will be understood that the present invention is also effective when color aberration is produced at edge portions due to more than one such causes or other cause.

Next, an instance will be described in which the smoothing processing is performed in both main and sub scan directions to correct for color aberration in both main and sub scan directions.

In the above examples, the smoothing in the sub-scan direction was performed to correct for color aberration only with the sub-scanning. In this case, when color aberration is produced in a main scan direction owing to the vibrations, it can not be dealt with. That is, when color aberration is also produced in the main scan direction, a spatial filter having a two-dimensional coefficient matrix as shown in FIG. 17B, for example, can be used, and more specifically, it can be implemented by adopting a circuit as shown in FIG. 17A for the smoothing circuits 152, 156 of FIG. 1.

Figures 17A, 17B:
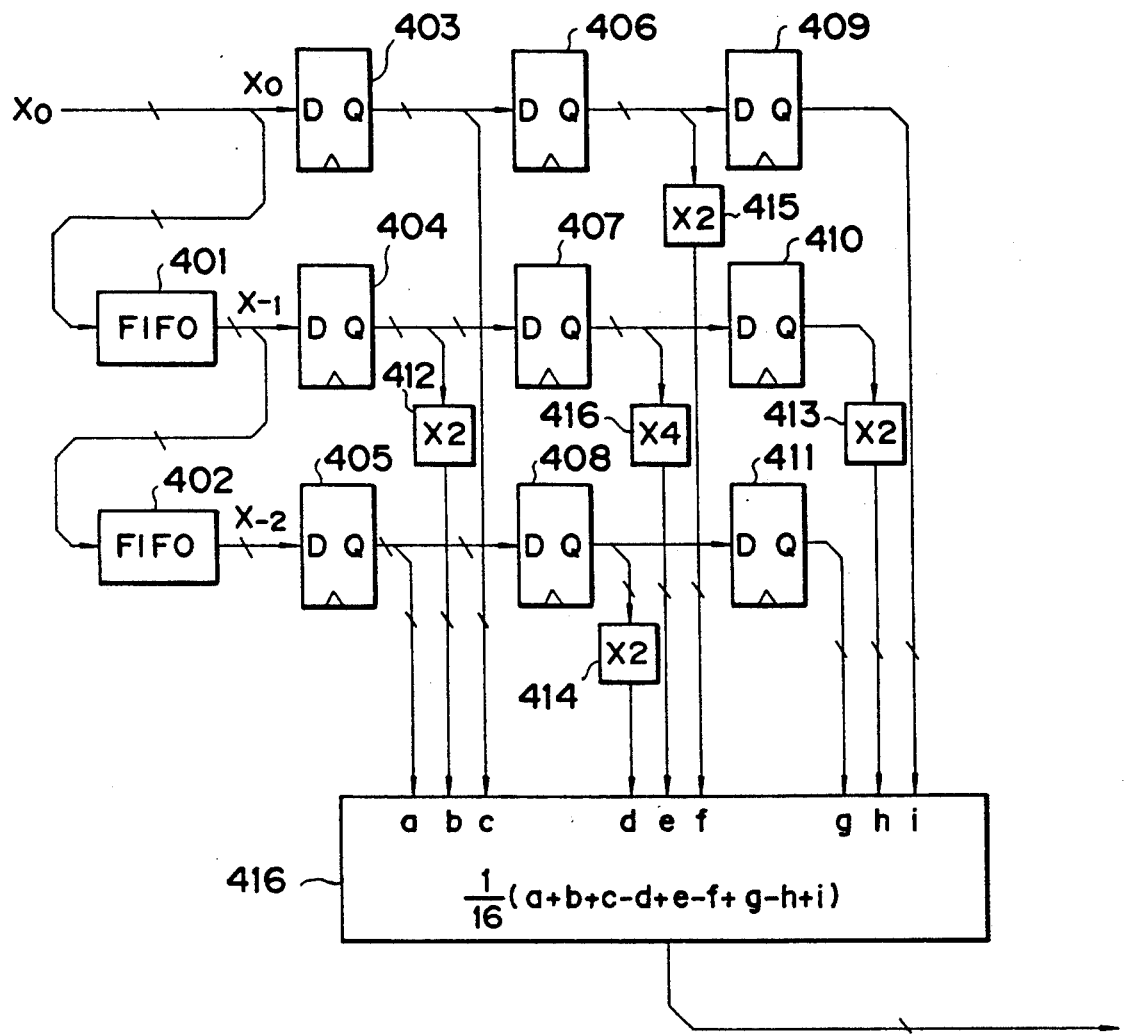
FIGS. 17A and 17B are views showing another example configured to correct for color aberration in a main scan direction.

In FIG. 17A, 401, 402 are line memories each consisting of a FIFO memory for delaying the image signal by one line, and 403-411 are flip-flops for delaying it by one pixel, wherein the output values of these nine flip-flops 403-411 correspond to the coefficients of a 3×3 spatial filter as shown in FIG. 17B. 412-415 are multipliers for doubling the input signal, and 416 is a multiplier for quadrupling the input signal.

The values of flip-flops 403-411 are input directly or after multiplication into the adder 416, which performs the operation of $1/16(a+b+c+d+e+f+g+h+i)$ for nine input signal values a-i and output it.

Accordingly, by adopting the circuit of FIG. 17A for the smoothing circuits 152, 156 of FIG. 1, the filter processing having the coefficients as shown in FIG. 17B can be performed for each of signals $R_1-G_1$ and $B_1-G_1$. Thereby, the color aberration correction based on the principle as described in FIGS. 15A-15D and 16A-16D is performed not only in the sub-scan direction but also in the main scan direction, so that it is possible to correct for color aberration produced in the main scan direction for some cause.

It is needless to say that the amount of delay in the delay circuit 153 of FIG. 1 must be set in accordance with the delay of signal produced by the circuit of FIG.

17A adopted for the smoothing circuits 152, 156 of FIG. 1.

Figure 18:
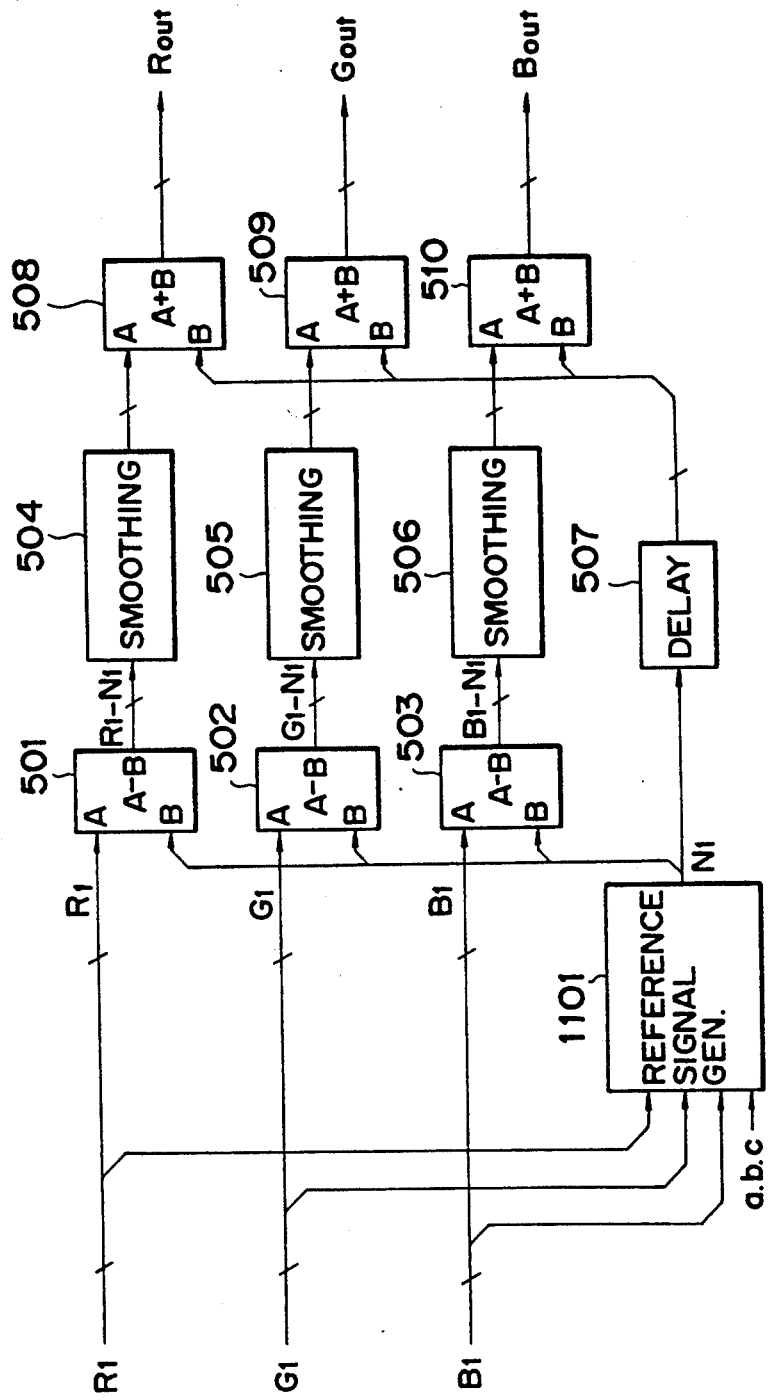
FIG. 18 is a circuit diagram showing another example of the present invention.

FIG. 18 shows another configuration example of color aberration correction circuit as shown in FIG. 2. In FIG. 18, 501-503 are subtraction circuits for subtracting a reference signal N1 output by a reference signal generation circuit 1101 from $R_1$, $G_1$ and $B_1$, respectively, 504-506 are smoothing circuits for performing the smoothing processing for outputs from the subtraction circuits 501-503, respectively, and 508-510 are addition circuits for adding the reference signal $N_1$ delayed by the delay circuit 507 to outputs from the smoothing circuits 504-506, respectively.

The reference signal generation circuit 1101 generates the reference signal $N_1$ with the following expression of $R_1$, $G_1$ and $B_1$ such that, $$N_1 = axR_1 + bxG_1 + cxB_1$$

and the corrected signals $R_{out}$, $G_{out}$ and $B_{out}$ can be obtained by smoothing the differences between $N_1$ and $R_1$, $G_1$, $B_1$, respectively, and adding $N_1$.

By setting $a=0$, $b=1$ and $c=0$ in the above expression, $N_1=G_1$, i.e., the reference signal is $G_1$, which is the same configuration as that of FIG. 1. Also, by adjusting the values of a, b, c in accordance with the sensor array and its MTF characteristic, the adaptive processing such as using $B_1$ or $R_1$ as the reference signal $N_1$ can be performed, and a further color aberration correction can be accomplished, compared with the fixed correction as shown in FIG. 1.

Figure 19:
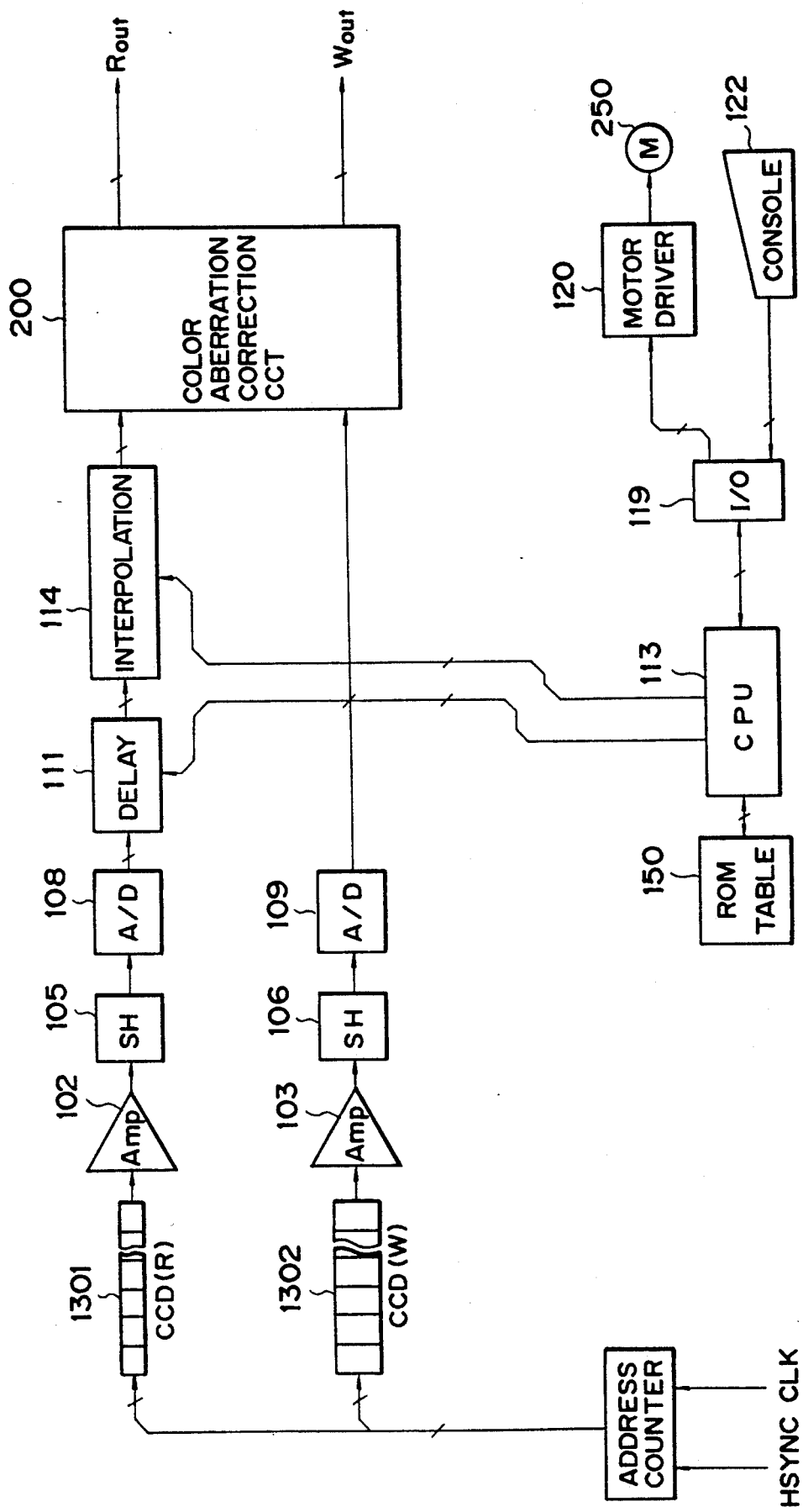
Figure 20:
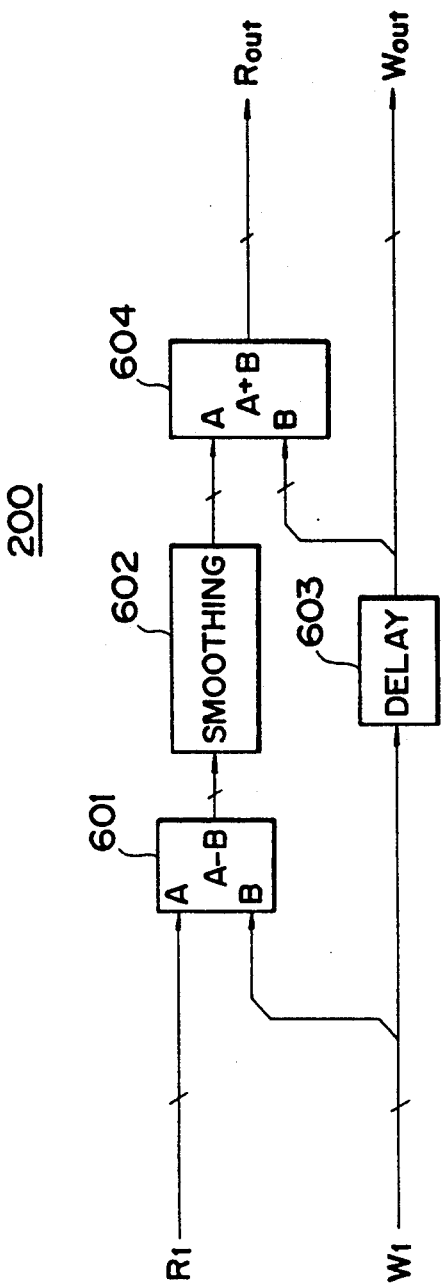

FIGS. 19-21 show another example of the present invention. The described examples were related to a full-color reading apparatus, but the present invention is not limited to such an apparatus. This example as shown in FIGS. 19-21 is related to a two-color reading apparatus for red and black.

FIG. 21 shows a sensor as used in this example. Here, 1301 is a line sensor for white component (W), having the sensitivity for all the visible light. On the other hand, 1302 is a sensor for red component (R), covered with a red filter and having the sensitivity only for the light of red component. With this filter, the red sensor 1302 has a lower sensitivity of luminous energy in a unit of area than the white sensor 1301. Thus, in order to correct for that, the red sensor 1302 has a dimension of 10 $\mu$m $\times$ 20 $\mu$m, while the other sensor 1301 has a dimension of 10 $\mu$m $\times$ 10 $\mu$m.

FIG. 19 shows a processing circuit in this example, wherein like parts as those of FIG. 2 are designated with same numerals.

In FIG. 19, an image signal read by CCD(W) 1301 and CCD(R) 1302 is output through amplifiers 102, 103, sample-and-hold circuits 105, 106, and A/D converters 108, 109, and further synchronized by a delay circuit 111.

Thereafter $R_{out}$ and $W_{out}$ are obtained after correcting for color aberration in a color aberration correction circuit 200 as shown in FIG. 20.

In FIG. 20, 601 is a subtraction circuit for subtracting the while signal $W_1$ from the red signal $R_1$, 602 is a smoothing circuit as shown in FIGS. 2 and 17, 603 is a delay circuit for delaying the white signal $W_1$ in accordance with the delay time for the smoothing circuit 602, and 604 is an addition circuit for adding the output of the smoothing circuit 602 and that of the delay circuit 603.

The operation of FIG. 20 is the same as that of FIG. 1, so that the color aberration correction is performed in the sub-scan direction if using the smoothing circuit 602 of FIG. 2, or in both the main and sub scan directions if using that of FIG. 17.

As above described, with the constitution in which the differential signal relative to the reference signal is smoothed, and further the reference signal is added to the smoothed differential signal, it is possible to correct for color aberration produced in reading a color image simply and appropriately.

While the present invention has been described with preferred examples, it will be understood that various variations and changes may be made within the scope as set forth in the appended claims.

What is claimed is:

1. A color image processing apparatus comprising:
input means for inputting pixel by pixel a plurality of color component signals representing a color image;
first operation means for obtaining a difference between a specified color component signal among said pluarlity of color component signals and another color component signal and outputting a differential signal;
second operation means for performing smooth processing on the differential signal obtained by said first operation means by using differential signals of a plurality of pixels; and
third operation means for adding the smoothed differential signal processed by said second operation means to said specified color component signal and outputting an added result as said another color component signal.

2. A color image processing apparatus according to claim 1, wherein said second operation means performs the smoothing processing two-dimensionally by using a plurality of pixels.

3. A color image processing apparatus according to claim 1, wherein said input means comprises a plurality of line sensors having mutually different color filters for reading a color image.

4. A color image processing apparatus according to claim 1, wherein said plurality of color component signals are red, green and blue component signals.

5. A color image processing apparatus according to claim 4 wherein said specified color component signal is a green component signal.

6. A color image processing apparatus comprising:
input means for inputting pixel by pixel a plurality of color component signals representing a color image;
first correction means for correcting for color aberration caused by magnification processing of an image represented by said plurality of color component signals; and
second correction means for correcting for color aberration caused by the mechanical vibration or differences between signal characteristics of colors in said plurality of color component signals by using color component signals of a plurality of pixels.

7. A color image processing apparatus according to claim 6, wherein said second correction means perform the correction operation in accordance with the differences between a specified color signal among said plurality of color component signals and other color component signals.

8. A color image processing apparatus according to claim 6, wherein said input means comprises a plurality of line sensors having mutually different color filters for reading a color image.

9. A color image processing apparatus according to claim 6, wherein said plurality of color component signals are red, green and blue component signals.

10. A color image processing method comprising the steps of:
   inputting pixel by pixel a plurality of color component signals representing a color image;
   a first operation step, of obtaining a difference between a specified color component signal among the plurality of color component signals and another color component signal and outputting a differential signal;
   a second operation step, of performing smoothing processing on the differential signal obtained in said first operation step by using differential signals of a plurality of pixels; and
   a third operation step, of adding the smoothed differential signals processed in said second operation step to the specified color component signal and outputting an added result as the another color component signal.

11. A color image processing method according to claim 10, wherein, in said second operation step, the smoothing processing is performed two-dimensionally by using a plurality of pixels.

12. A color image processing method according to claim 10, wherein said inputting step is performed by using a plurality of line sensors having mutually different color filters for reading a color image.

13. A color image processing method according to claim 10, wherein the pluraltiy of color component signals are red, green and blue component signals.

14. A color image processing method according to claim 13, wherein the specified color component signal is a green component signal.

15. A color image processing method comprising the steps of:
   inputting pixel by pixel a plurality of color component signals representing a color image;
   a first correction step, of correcting for color aberration caused by magnification processing of an image represented by the plurality of color component signals; and
   a second correction step, of correcting for color aberration caused by the mechanical vibration or differences between signal characteristics of colors in the plurality of color component signals by using color component signals of a plurality of pixels.

16. A color image processing method according to claim 15, wherein, in said second correction step, the correction opertion is performed in accordance with the differences between a specified color signal among the plurality of color component signals and another color component signal.

17. A color image processing method according to claim 15, wherein said inputting step is performed by using a plurality of line sensors having mutually different color filters for reading a color image.

18. A color image processing method according to claim 15, wherein the plurality of color component signals are red, green and blue component signals.

19. A color image processing apparatus comprising:
   input means for inputting pixel by pixel a plurality of color component signals representing a color image;
   first correction means for correcting for color aberration caused by magnification processing of an image represented by said plurality of color component signals, including delay means for delaying at least one of the plurality of color component signals relative to another color component signal; and
   second correction means for correcting for color aberrtion caused by the mechanical vibration or differences between signal characteristics of colors in said plurality of color component signals by using color component signals of a plurality of pixels.

20. A color image processing method comprising the steps of:
   inputting pixel by pixel a plurality of color component signals representing a color image;
   a first correction step, of correcting for color aberration caused by magnification processing of an image represented by said plurality of color component signals, with at least one of the plurality of color component signals being delayed relative to another color component signal; and
   a second correction step, of correcting for color aberrtion caused by the mechanical vibration or differences between signal characteristics of colors in said plurality of of pixels.

* * * * *

UNITED STATES PATENT AND TRADEMARK OFFICE
CERTIFICATE OF CORRECTION

PATENT NO. : 5,321,529

DATED : June 14, 1994

INVENTOR(S) : MASAHIRO FUNADA

It is certified that error appears in the above-identified patent and that said Letters Patent is hereby corrected as shown below:

TITLE PAGE:

AT [56] REFERENCES CITED

Foreign Patent Documents, "404022274A 1/1992 Japan" should read --4-22274A 1/1992 Japan--.

COLUMN 1

Line 22, "athree-line" should read --a three-line--.
    Line 30, "should" should read --should be--.
    Line 35, "the" should read --when the--.
    Line 54, "foregoings," should read --foregoing,--.
    Line 62, "bt" should read --but--.

COLUMN 2

Line 47, "DESCRIPTION" should read --DETAILED DESCRIPTION--.
    Line 48, "DETAILED" should be deleted.
    Line 64, "thr" should read --the--.
    Line 65, "specularp-" should read --specular--.

COLUMN 3

Line 7, "note" should read --noted--.
    Line 39, "detector" should read --detectors--.

COLUMN 4

Line 57, "$Y_t=X_t\_1$" should read --$Y_t=X_{t-1}$--.
    Line 67, "spacial" should read --spatial--.

UNITED STATES PATENT AND TRADEMARK OFFICE
CERTIFICATE OF CORRECTION

PATENT NO. : 5,321,529
DATED : June 14, 1994
INVENTOR(S) : MASAHIRO FUNADA

It is certified that error appears in the above-identified patent and that said Letters Patent is hereby corrected as shown below:

COLUMN 5

Line 2, "differencs" should read --differences--.
Line 29, "$X_{311}$" should read --$X_{-1}$--.
LIne 32, "spacial" should read --spatial--.
Line 33, "spacial" should read --spatial--.
Line 56, "15A to 15D" should read --15A to 15D,--.
Line 57, "aerration" should read --aberration--.

COLUMN 6

Line 27, "causes or other cause" should read --cause or other causes--.
Line 55, "output" should read --outputs--.

COLUMN 7

Line 60, "while signal $W_1$" should read --white signal $W_1$--.

COLUMN 8

Line 24, "smooth" should read --smoothing--.
Line 46, "claim 4" should read --claim 4,--.
Line 64, "perform" should read --performs--.
Line 67, "other" should read --another--.
Line 68, "signals." should read --signal.--.

UNITED STATES PATENT AND TRADEMARK OFFICE
CERTIFICATE OF CORRECTION

PATENT NO. : 5,321,529
DATED : June 14, 1994
INVENTOR(S) : MASAHIRO FUNADA

It is certified that error appears in the above-identified patent and that said Letters Patent is hereby corrected as shown below:

COLUMN 9

Line 24, "the" should read --said--.

COLUMN 10

Line 6, "opertion" should read --operation--.
    Line 30, "aberrtion" should read --aberration--.
    Line 41, "said" should read --the--.
    Line 46, "aberrtion" should read --aberration--.
    Line 48, "said" should read -the-- and
           "of of" shoud read --of--.

Signed and Sealed this

Seventh Day of March, 1995

Attest:

BRUCE LEHMAN

*Attesting Officer*  *Commissioner of Patents and Trademarks*